United States Patent
Hsieh et al.

(10) Patent No.: US 12,166,253 B2
(45) Date of Patent: Dec. 10, 2024

(54) ELECTROLYTIC REDUCTION SYSTEM AND METHOD OF VANADIUM ELECTROLYTE

(71) Applicant: Institute of Nuclear Energy Research, Atomic Energy Council, Executive Yuan, R.O.C, Taoyuan (TW)

(72) Inventors: Chin-Lung Hsieh, Taoyuan (TW); Cian-Tong Lu, Taoyuan (TW); Ya-Hsin Chang, Taoyuan (TW); Kan-Lin Hsueh, Taoyuan (TW)

(73) Assignee: Institute of Nuclear Energy Research, Atomic Energy Council, Executive Yuan, R.O.C, Taoyuan (TW)

( * ) Notice: Subject to any disclaimer, the term of this patent is extended or adjusted under 35 U.S.C. 154(b) by 102 days.

(21) Appl. No.: 17/567,966

(22) Filed: Jan. 4, 2022

(65) Prior Publication Data

US 2022/0216495 A1    Jul. 7, 2022

(30) Foreign Application Priority Data

Jan. 4, 2021  (TW) ................................ 110100016

(51) Int. Cl.
*H01M 8/18*     (2006.01)
*C25C 1/22*     (2006.01)
(Continued)

(52) U.S. Cl.
CPC ............ *H01M 8/188* (2013.01); *C25C 1/22* (2013.01); *C25C 7/02* (2013.01); *C25C 7/04* (2013.01); *H01M 8/08* (2013.01); *H01M 10/38* (2013.01)

(58) Field of Classification Search
CPC .............................. H01M 8/188; H01M 8/18
See application file for complete search history.

(56) References Cited

U.S. PATENT DOCUMENTS

2018/0102561 A1 *  4/2018  Sullivan ................ C01G 31/02
2021/0083305 A1 *  3/2021  Koyama ................ H01M 4/94

FOREIGN PATENT DOCUMENTS

CA    2420014 A1   2/2002
CN    1502141 A    6/2004
(Continued)

OTHER PUBLICATIONS

Martin, Jan, Katharina Schafner, and Thomas Turek. "Preparation of electrolyte for vanadium redox-flow batteries based on vanadium pentoxide." Energy Technology 8.9 (2020): 2000522. (Year: 2020).*
(Continued)

*Primary Examiner* — Sadie White
*Assistant Examiner* — Kayla Elaine Clary
(74) *Attorney, Agent, or Firm* — Locke Lord LLP; Tim Tingkang Xia, Esq.

(57) ABSTRACT

Disclosed are an electrolytic reduction system of a vanadium electrolyte and a method for producing the electrolyte. The electrolytic reduction system includes a separating device and an electrolytic tank. The separating device is configured to separate a mixture consisting of a vanadium pentoxide (V2O5) solid and a sulfate acid solution, thereby obtaining a vanadium solution from a liquid discharging port of the separating device and a vanadium solid from a solid discharging port. The vanadium solution includes pentavalent vanadium ions. The electrolytic tank connects to the liquid discharging port of the separating device to contain the vanadium solution. In the method for producing the vanadium electrolyte, other chemical reagents are unnecessarily to be added into the mixture, and the vanadium solution is subjected to an electrolytic reduction process, such that the pentavalent vanadium ions are reduced to tetravalent vanadium ions and trivalent vanadium ions in the electrolytic tank.

3 Claims, 6 Drawing Sheets

(51) Int. Cl.
*C25C 7/02* (2006.01)
*C25C 7/04* (2006.01)
*H01M 8/08* (2016.01)
*H01M 10/38* (2006.01)

(56) References Cited

FOREIGN PATENT DOCUMENTS

| JP | 2004519814 A | 7/2004 |
| WO | 0215317 A1 | 2/2002 |

OTHER PUBLICATIONS

Izadi, Mohsen, et al. "Optimizing the design and performance of solid-liquid separators." International Journal of Thermofluids 5 (2020): 100033. (Year: 2020).*

* cited by examiner

ELECTROLYTIC REDUCTION SYSTEM AND METHOD OF VANADIUM ELECTROLYTE

CROSS REFERENCE TO RELATED APPLICATION

This application claims the benefits of Taiwan application Serial No. 110100016, filed on Jan. 4, 2021 the disclosures of which are incorporated by references herein in its entirety.

TECHNICAL FIELD

The present invention relates to a vanadium electrolyte for a vanadium battery, and particularly provides an electrolytic reduction system and method of a vanadium electrolyte.

BACKGROUND

There are 46 patents for preparing vanadium electrolytes from industrial waste recovery. China is the main applicant country. The Chinese Academy of Sciences, Squirrel, Anshan Iron and Steel Group Corporation, Beijing Zhongkai, etc. are the main patentees. In only 1 of the 46 patents, $V_2O_5$ powder is dissolved in an $H_2SO_4$ solution and electrolyzed into 3.5-valent vanadium. The patent has been applied for in China, Japan, Canada and other countries. The patent publication numbers are as follows: CN 1502141 A, CA 2420014 A1, JP 2004519814(A), WO 02/15317 A1.

A traditional method is to mix vanadium pentoxide with a sulfuric acid solution, add a reducing agent, and prepare a sulfuric acid solution containing tetravalent vanadium. The tetravalent vanadium is electrolyzed into 3.5-valent vanadium. 3.5-valent vanadium is a mixed solution of tetravalent vanadium and trivalent vanadium. The solubility of pentavalent vanadium in sulfuric acid is very low, about 0.1 M to 0.2 M. Flow batteries require a vanadium ion concentration of 1.0 M to 3.0 M. The traditional method is to reduce pentavalent vanadium dissolved in sulfuric acid to tetravalent vanadium with a reducing agent. The solubility of tetravalent vanadium can reach 3.0 M or more. Part of the tetravalent vanadium is reduced to trivalent vanadium by electrolytic reduction, such that the average valence of vanadium ions is 3.5.

However, the dissolution properties of vanadium solid are so chemical additives and/or other additives are generally added to improve the dissolution properties. However, the additives tend to reduce the purity of the electrolyte and thus affect the performance of the vanadium battery. Therefore, the general method for producing a vanadium electrolyte still requires complicated processes to remove the additives.

In view of this, it is urgent to provide an electrolytic reduction system of a vanadium electrolyte and a method for producing the electrolyte to overcome the defects of the conventional electrolytic reduction system and method of a vanadium electrolyte.

SUMMARY

Therefore, one aspect of the present invention is to provide an electrolytic reduction system of a vanadium electrolyte. The electrolytic reduction system comprises a separating device and an electrolytic tank, and can effectively electrolytically reduce pentavalent vanadium ions in a sulfuric acid solution to tetravalent vanadium ions and trivalent vanadium ions, thereby preparing the vanadium electrolyte applicable to vanadium batteries.

Another aspect of the present invention is to provide a method for producing a vanadium electrolyte, comprising the following steps: performing a separating process on a sulfuric acid solution containing insoluble vanadium pentoxide solid to obtain a sulfuric acid solution in which pentavalent vanadium ions are dissolved, and reducing the pentavalent vanadium ions by an electrolytic reduction reaction, thereby preparing the vanadium electrolyte for vanadium batteries.

According to one aspect of the present invention, an electrolytic reduction system of a vanadium electrolyte is provided. The electrolytic reduction system comprises a separating device and an electrolytic tank. The separating device is configured to separate a mixture consisting of a vanadium pentoxide solid and a sulfuric acid solution, thereby obtaining a vanadium solution from a liquid discharging port of the separating device and a vanadium solid from a solid discharging port of the separating device. The vanadium solution comprises pentavalent vanadium ions. The electrolytic tank comprises a separating membrane, and the separating membrane separates the electrolytic tank into a vanadium solution sub-tank and a sulfuric acid sub-tank. The vanadium solution sub-tank connects to the liquid discharging port of the separating device to contain the vanadium solution. The electrolytic tank is configured to reduce the pentavalent vanadium ions in the vanadium solution to tetravalent vanadium ions and trivalent vanadium ions, and a molar ratio of the tetravalent vanadium ions to the trivalent vanadium ions is $(1+/-0.1):(1+/-0.10)$.

According to an embodiment of the present invention, the separating device may be a cyclone separator.

According to another embodiment of the present invention, the electrolytic reduction system may optionally comprises a filtering device. The filtering device comprises a liquid inlet and a filtrate outlet, wherein the liquid inlet connects to the liquid discharging port of the separating device, and the filtrate outlet connects to the vanadium solution sub-tank of the electrolytic tank. The filtering device is configured to filter the vanadium solution.

According to another embodiment of the present invention, the filtering device may optionally comprise a counterflow circuit, and the counterflow circuit comprises a counterflow feeding pipe and a counterflow discharging pipe. The counterflow feeding pipe connects to the liquid discharging port of the separating device and the filtrate outlet of the filtering device, and the counterflow discharging pipe connects to a feeding port of the separating device and the liquid inlet of the filtering device.

According to another embodiment of the present invention, the vanadium solution sub-tank may optionally comprise a voltage detector. The voltage detector is configured to measure a voltage of the vanadium solution to detect the molar ratio of the tetravalent vanadium ions to the trivalent vanadium ions.

According to another aspect of the present invention, a method for producing a vanadium electrolyte is provided. The producing method comprises the following steps: first mixing a vanadium pentoxide solid with first sulfuric acid liquid to form a mixture consisting of part of the vanadium pentoxide solid and the sulfuric acid solution, the sulfuric acid solution containing pentavalent vanadium ions; then, performing a separating process on the mixture to separate the part of the vanadium pentoxide solid from the sulfuric acid solution; and then, performing an electrolytic reduction process on the sulfuric acid solution to reduce the pentavalent vanadium ions to tetravalent vanadium ions and trivalent vanadium ions, wherein a molar ratio of the tetravalent vanadium ions to the trivalent vanadium ions is (1+/−0.1): (1+/−0.1).

According to an embodiment of the present invention, the separating process is performed by a cyclone separator.

According to another embodiment of the present invention, before the electrolytic reduction process is performed, the producing method may selectively perform a filtering process to filter the sulfuric acid solution.

According to another embodiment of the present invention, a feeding step may be performed before the electrolytic reduction process to introduce the sulfuric acid solution into the vanadium solution sub-tank of the electrolytic tank, and introduce second sulfuric acid liquid into the sulfuric acid sub-tank of the electrolytic tank. After the feeding step is performed, the sulfuric acid solution is subjected to an electrolytic reduction step so as to form a reduced solution from the sulfuric acid solution. Then, a detecting step is performed on the reduced solution to determine a vanadium ion composition of the reduced solution. If a molar number of the tetravalent vanadium ions is greater than a molar number of the trivalent vanadium ions, the electrolytic reduction step is performed. If the molar number of the tetravalent vanadium ions is less than the molar number of the trivalent vanadium ions, the feeding step is performed. Furthermore, if the molar number of the tetravalent vanadium ions is equal to the molar number of the trivalent vanadium ions, the vanadium electrolyte of the present invention is prepared.

According to another embodiment of the present invention, the detecting step is to determine the vanadium ion composition of the reduced solution by measuring a voltage of the reduced solution.

By the electrolytic reduction system of the vanadium electrolyte and the method for producing the electrolyte of the present invention, the mixture containing the vanadium pentoxide solid and the sulfuric acid solution may be effectively separated by the separating device, and further the pentavalent vanadium ions in the solution may be effectively reduced by the subsequent electrolytic reduction process. Accordingly, the present invention does not need to add additional chemical additives and/or other additives that can improve the dissolution properties of vanadium pentoxide, and does not require a purification step, so the process flow can be reduced, impurities in the sulfuric acid solution can be reduced, and the efficiency of the electrolytic reduction process can be improved.

BRIEF DESCRIPTION OF DRAWINGS

In order to have a more complete understanding of the embodiments and advantages of the present invention, reference is made to the following description and the corresponding drawings. It must be emphasized that the various features are not drawn to scale and are for illustration purposes only. The contents of the relevant diagrams are described as follows.

DETAILED DESCRIPTION OF DISCLOSED EMBODIMENTS

The specific implementation of the present invention will be further described below with reference to the accompanying drawings and embodiments. The following embodiments are only used to illustrate the technical solutions of the present invention more clearly, and cannot be used to limit the protection scope of the present invention.

The "sulfuric acid liquid" referred to in the present invention refers to an aqueous sulfuric acid solution, and the "sulfuric acid solution" can refer to an aqueous sulfuric acid solution in which a vanadium pentoxide solid is dissolved, or an aqueous sulfuric acid solution in which a vanadium pentoxide solid and other substances are dissolved.

Figure 1:
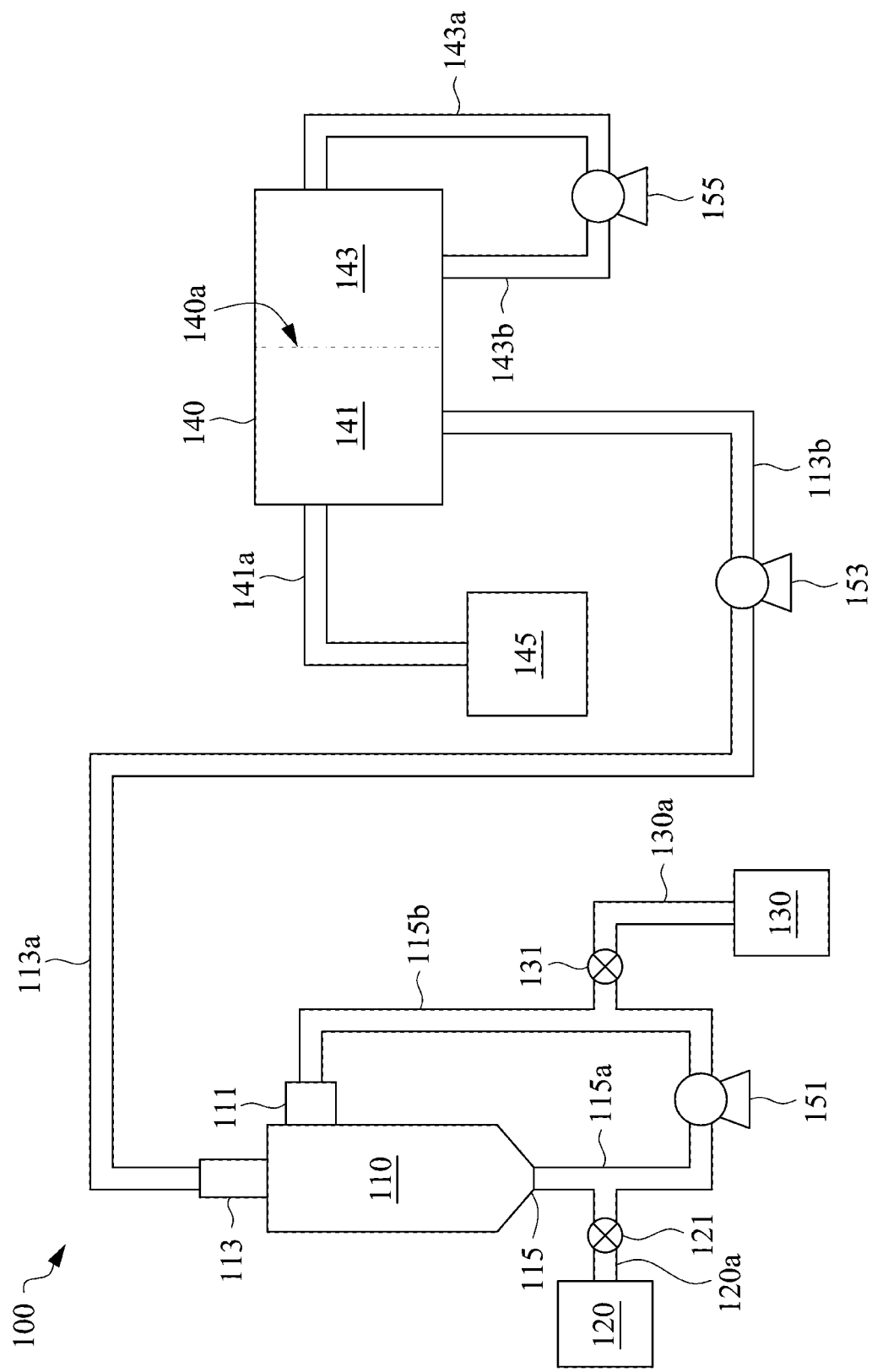
FIG. 1 is a schematic device diagram of an electrolytic reduction system of a vanadium electrolyte according to an embodiment of the present invention.

Please refer to FIG. 1. FIG. 1 is a schematic device diagram of an electrolytic reduction system of a vanadium electrolyte according to an embodiment of the present invention. The electrolytic reduction system 100 includes a separating device 110 and an electrolytic tank 140. The separating device 110 and the electrolytic tank 140 are coupled to each other. Specifically, the separating device 110 is coupled to the electrolytic tank 140 via a pipeline 113a.

The separating device 110 includes a feeding port 111, a liquid discharging port 113 and a solid discharging port 115. The separating device 110 of the present invention is not particularly limited, and only needs to be used to separate liquid from an insoluble solid in a mixture consisting of the liquid and the insoluble solid to be separated.

In some specific embodiments, the separating device 110 of the present invention may be a cyclone separator. The mixture to be separated is introduced into the separating device 110 via the feeding port 111, the separated insoluble solid is discharged from the solid discharging port 115, and the separated liquid is discharged from the liquid discharging port 113.

The mixture is prepared by adding vanadium pentoxide solid (V2O5) to sulfuric acid liquid. Because the vanadium pentoxide solid has poor dissolution properties, the vanadium pentoxide solid cannot be completely dissolved in the sulfuric acid liquid. In other words, the mixture is a sulfuric acid solution containing the vanadium pentoxide solid (that is, part of the vanadium pentoxide, this part is insoluble in the sulfuric acid liquid) and pentavalent vanadium ions (that is, the other part of vanadium pentoxide dissolved in the sulfuric acid liquid). The reaction mechanism of the vanadium pentoxide solid dissolved in the sulfuric acid liquid is shown in the following formula (I).

$$2H^+ + V_2O_5 \leftrightarrow 2VO_2^+ + H_2O \tag{I}$$

The sulfuric acid liquid can be stored in the sulfuric acid tank 120. When the sulfuric acid liquid needs to be pumped to the separating device 110, a valve 121 is opened, so the sulfuric acid liquid may be introduced into a pipeline 115a via a pipeline 120a, and further pumped to the feeding port 111 via a pump 151 and a pipeline 115b. At the same time, a valve 131 may be opened, and the vanadium pentoxide solid stored in a storage tank 130 may be added to the sulfuric acid liquid flowing through the pipeline 115b via a pipeline 130a to form the mixture. The mixture is pumped to the separating device 110 to be further separated by the separating device 110.

It should be noted that the storage tank 130, the pipeline 130a and the valve 131 shown in FIG. 1 are merely illustrative. Those of ordinary skill in the technical field to which the present invention belongs can use well-known technical means or unit structures to feed the vanadium pentoxide solid into the sulfuric acid liquid to mix the two and prevent the sulfuric acid liquid in the pipeline 115b from flowing back into the storage tank 130.

The separated vanadium pentoxide solid (that is, the part not dissolved in the sulfuric acid liquid) is discharged via the solid discharging port 115. In order to further improve the utilization rate of the vanadium pentoxide solid, the discharged vanadium pentoxide solid is introduced into the pipeline 115a to be mixed with the sulfuric acid liquid pumped into the pipeline 115a. Similarly, in the pipeline 115a, the vanadium pentoxide solid may not be completely dissolved in the sulfuric acid liquid. In other embodiments, in the pipeline 115a, the vanadium pentoxide solid may be completely dissolved in the sulfuric acid liquid. In addition, in other embodiments, the vanadium pentoxide solid discharged from the solid discharging port 115 may also be recovered, subjected to further treatment (such as a drying step), and fed into a storage tank 130 by means of automated equipment or manual transportation.

In some embodiments, the sulfuric acid liquid and the vanadium pentoxide solid may also be added to the electrolyte mixing tank. After mixing, the mixture is pumped to the feeding port 111 via a pipeline. In the embodiments, the vanadium pentoxide solid discharged from the solid discharging port 115 may be recovered and fed into the mixing tank and be mixed with the sulfuric acid liquid again. In other embodiments, the sulfuric acid tank 120 and the storage tank 130 may connect to the mixing tank, and the mixing tank further connects to the feeding port 111.

The sulfuric acid solution containing pentavalent vanadium ions discharged from the liquid discharging port 113 may be pumped to a vanadium solution sub-tank 141 of the electrolytic tank 140 via the pipeline 113a, the pump 153 and the pipeline 113b. The electrolytic tank 140 includes a vanadium solution sub-tank 141, a sulfuric acid sub-tank 143 and a separating membrane 140a, and the separating membrane 140a separates the vanadium solution sub-tank 141 from the sulfuric acid sub-tank 143. It may be understood that the separating membrane 140a is not particularly limited, and only needs to not allow vanadium ions in the sulfuric acid solution in the vanadium solution sub-tank 141 to pass through. In the electrolytic tank 140, a reduction reaction is performed in the vanadium solution sub-tank 141, and the pentavalent vanadium ions in the sulfuric acid solution may be reduced to tetravalent vanadium ions and trivalent vanadium ions. The reaction mechanism of reduction of the pentavalent vanadium ions to the tetravalent vanadium ions and the trivalent vanadium ions is shown in the following formulas (II) and (III).

$$VO_2^+ + 2H^+ + e^- \rightarrow VO^{2+} + H_2O \quad (II)$$

$$VO^{2+} + 2H^+ + e^- \rightarrow V^{3+} + H_2O \quad (III)$$

When the pentavalent vanadium ions are reduced to the tetravalent vanadium ions and the trivalent vanadium ions, the sulfuric acid solution (containing the tetravalent vanadium ions and the trivalent vanadium ions) in the vanadium solution sub-tank 141 is guided to the storage tank 145 via the pipeline 141a, and may be used as the vanadium electrolyte of a vanadium battery. It may be understood that, in some embodiments, the vanadium solution sub-tank 141 may optionally include a detector to measure the molar numbers of the tetravalent vanadium ions and the trivalent vanadium ions in the sulfuric acid solution of the vanadium solution sub-tank 141, thereby confirming whether the vanadium ion composition (that is, the content of the tetravalent vanadium ions and the trivalent vanadium ions) of the sulfuric acid solution meets the requirements of application. The detector can measure the potential of the sulfuric acid solution to know the composition of vanadium ions in the sulfuric acid solution. In some specific embodiments, according to application requirements, the molar ratio of the tetravalent vanadium ions to the trivalent vanadium ions in the sulfuric acid solution may be 1:0 to 0:1, preferably (1+/−0.5):(1+/−0.5), and more preferably, (1+/−0.1):(1+/−0.1).

Further, the sulfuric acid sub-tank 143 is used to store the sulfuric acid liquid required for the electrolysis, and the sulfuric acid liquid in the sulfuric acid sub-tank 143 may be circulated via the pipeline 143a, the pump 155 and the pipeline 143b. It may be understood that, according to the feeding method of the sulfuric acid sub-tank 143, the pipeline 143a or the pipeline 143b may connect to the sulfuric acid storage tank (not shown), so that the sulfuric acid liquid in the sulfuric acid sub-tank 143 may be circulated. In some embodiments, the pipeline 143a or the pipeline 143b may connect to the sulfuric acid tank 120, thereby reducing the number of storage tank units. The arrangement of the pipeline and the valve body is well known to those of ordinary skill in the technical field to which the present invention belongs, so it will not be repeated here.

Due to poor dissolution properties of a vanadium pentoxide solid (i.e. pentavalent vanadium ions), to increase the content of tetravalent vanadium ions and trivalent vanadium ions produced by electrolysis, the sulfuric acid liquid used to dissolve the vanadium pentoxide solid has a higher concentration to increase the dissolved amount of the vanadium pentoxide solid. According to the foregoing description, in the separating device 110 and the electrolytic tank 140, the concentration of the sulfuric acid liquid is not changed. Therefore, the concentration of the sulfuric acid liquid in the sulfuric acid solution stored in the storage tank 145 (that is, the concentration of the sulfuric acid liquid in the prepared electrolyte) is equal to the concentration of the sulfuric acid liquid stored in the sulfuric acid tank 120.

In some embodiments, to make the produced electrolyte meet the application requirements of vanadium batteries, the storage tank 145 may connect to a diluting device (not shown) to reduce the concentration of the sulfuric acid liquid in the electrolyte. In some specific embodiments, the diluting device may be an electrophoresis sulfuric acid separating tank in which sulfate (SO42−) in the electrolyte is replaced with hydroxide (OH—) through an ion exchange membrane, thereby reducing the concentration of the sulfuric acid liquid. In the specific embodiments, the concentration of the sulfuric acid liquid in the electrolyte may be 4 mol (M) to 6 mol (M), and after the dilution process of the electrophoresis sulfuric acid separating tank, the concentration of the sulfuric acid liquid may be 1 mol (M) to 3 mol (M).

It should be noted that the tetravalent vanadium ions and trivalent vanadium ions have good dissolution properties, so when the concentration of the sulfuric acid liquid in the electrolyte decreases, the tetravalent vanadium ions and trivalent vanadium ions will not precipitate out.

Based on the aforementioned description, it may be understood that the units and pipelines of the electrolytic reduction system 100 of the present invention are made of materials that can withstand acid corrosion.

In addition, according to the aforementioned description, the mixture of the present invention only consists of the sulfuric acid solution and the undissolved vanadium pentoxide solid, and does not contain other chemical additives or other additives that may be used to improve the solubility of the vanadium pentoxide solid. Therefore, the sulfuric acid solution after solid-liquid separation does not contain other chemical additives or other additives, and the electrolytic efficiency of the subsequent electrolytic reduction reaction may be further improved.

Figure 2:
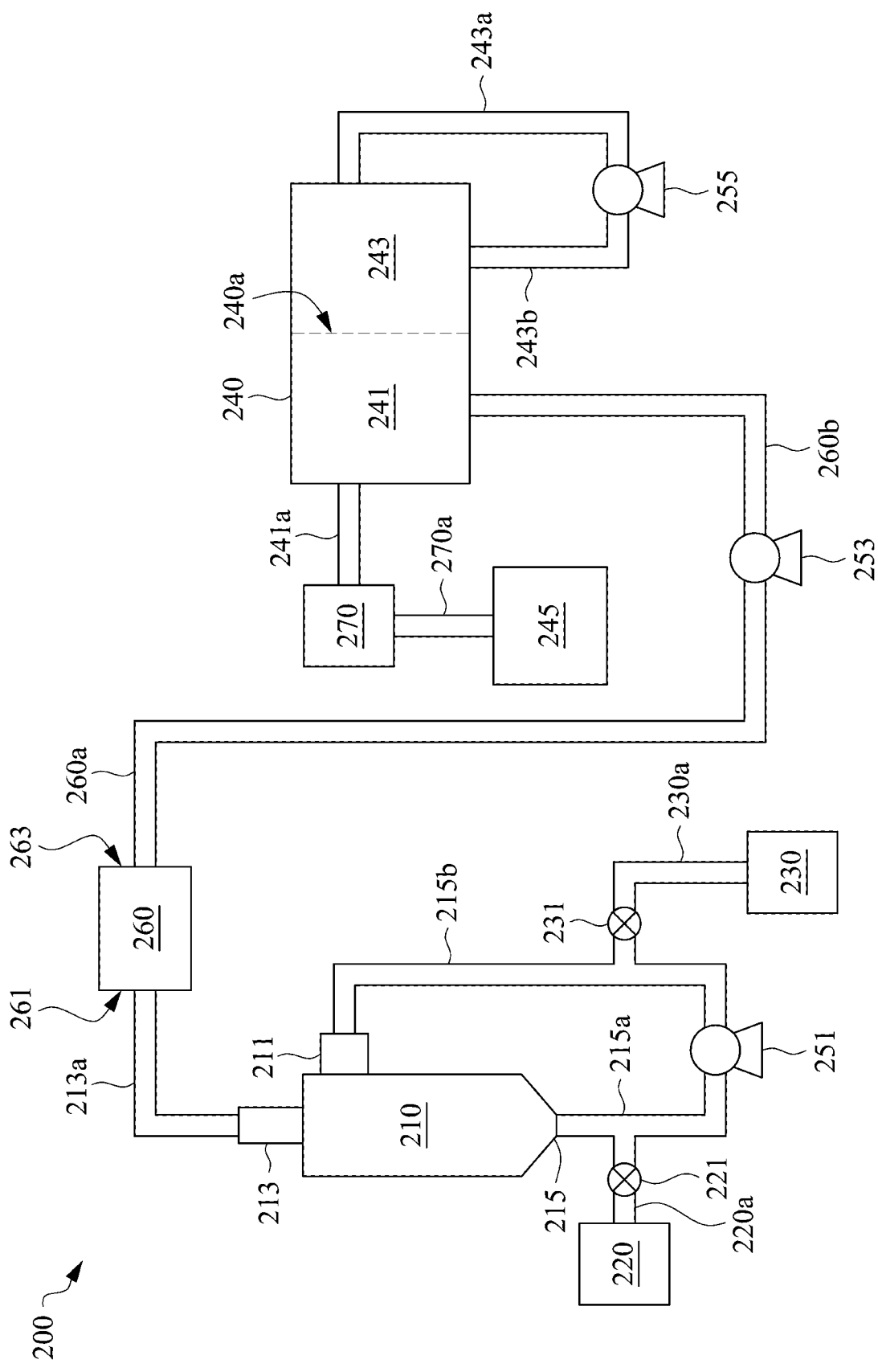
FIG. 2 is a schematic device diagram of an electrolytic reduction system of a vanadium electrolyte according to another embodiment of the present invention.

Please refer to FIG. 2. FIG. 2 is a schematic device diagram of an electrolytic reduction system of a vanadium electrolyte according to another embodiment of the present invention. The unit configuration and connection relationship of the electrolytic reduction system 200 are substantially the electrolyte as those of the electrolytic reduction system 100. The difference between the two electrolytic reduction systems is that the electrolytic reduction system 200 includes a filtering device 260 and a voltage detector 270.

As the flow of the sulfuric acid solution through the filtering device 260 increases, the vanadium pentoxide solid remaining in the filtering device 260 easily blocks filtering holes, thereby reducing the filtering efficiency of the filtering device 260. Therefore, in some embodiments, the filtering device 260 may optionally include a counterflow circuit used to remove the vanadium pentoxide solid remaining in the filtering holes, thereby extending the service life of the filtering device 260, and improving the efficiency of the filtering device 260.

The counterflow circuit removes the vanadium pentoxide solid from the filtering device 260 in a counterflow manner. A counterflow liquid (for example, a sulfuric acid liquid) may be introduced from the filtrate outlet 263 of the filtering device 260, and the counterflow liquid and the removed vanadium pentoxide solid may be discharged from the liquid inlet 261. Since the amount of the vanadium pentoxide solid in the filtering device 260 is very small, the removed vanadium pentoxide solid may generally be dissolved in the counterflow liquid.

The removal circuit removes the vanadium pentoxide solid from the filtering device 260 in a counterflow manner. A removal liquid (for example, a sulfuric acid liquid) may be introduced from the filtrate outlet 263 of the filtering device 260, and the removal liquid and the removed vanadium pentoxide solid may be discharged from the liquid inlet 261. Since the amount of the vanadium pentoxide solid in the filtering device 260 is very small, the removed vanadium pentoxide solid may generally be dissolved in the removal liquid.

The voltage detector 270 is arranged between the vanadium solution sub-tank 241 and the storage tank 245 of the electrolytic tank 240 to detect the vanadium ion composition of the sulfuric acid solution after electrolysis. Specifically, the voltage detector 270 is configured to measure the voltage of the vanadium solution to detect the molar ratio of the tetravalent vanadium ions to the trivalent vanadium ions in the sulfuric acid solution.

As shown in FIG. 2, although the voltage detector 270 connects to the vanadium solution sub-tank 241 via the pipeline 241a, the present invention is not limited to this. In some embodiments, a measuring terminal of the voltage detector 270 may directly measure the vanadium ion composition of the sulfuric acid solution in the vanadium solution sub-tank 241.

In other embodiments, the measuring terminal of the voltage detector 270 may be used to measure the vanadium ion composition of the sulfuric acid solution in the pipeline 241a, and the voltage detector 270 may signally connect to a valve (not shown) arranged in the pipeline 270a. According to the detection result of the voltage detector 270, if the vanadium ion composition of the sulfuric acid solution meets the application requirements, the voltage detector 270 may transmit an "open" signal to the valve arranged in the pipeline 270a to allow the sulfuric acid solution to flow into the storage tank 245 via the pipeline 270a.

Figure 3:
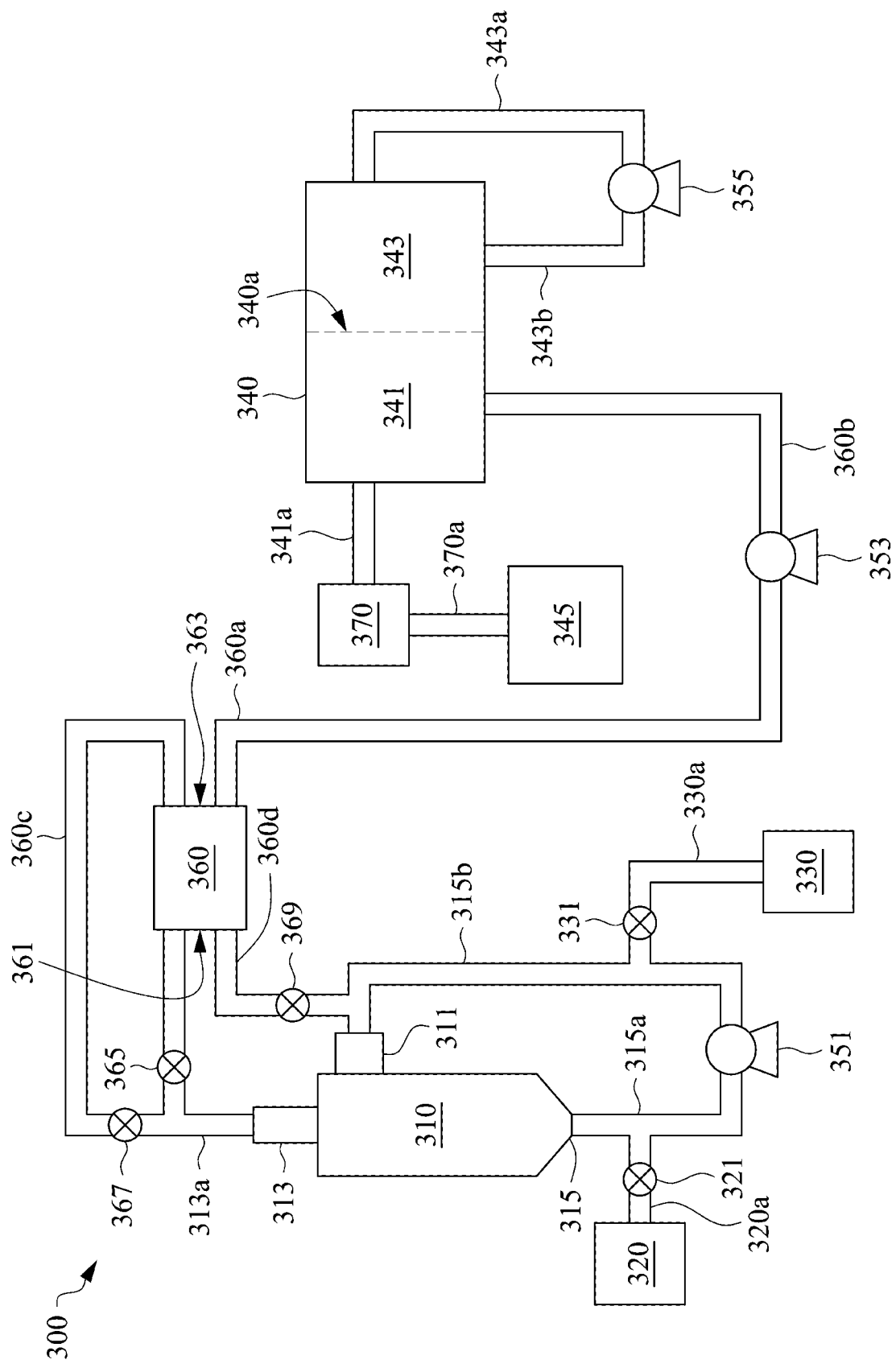
FIG. 3 is a schematic device diagram of an electrolytic reduction system of a vanadium electrolyte according to yet another embodiment of the present invention.

Please refer to FIG. 3. FIG. 3 is a schematic device diagram of an electrolytic reduction system of a vanadium electrolyte according to another embodiment of the present invention. The unit configuration and connection relationship of the electrolytic reduction system 300 are substantially the electrolyte as those of the electrolytic reduction system 200. The difference between the two electrolytic reduction systems is that the filtering device 360 of the electrolytic reduction system 300 further includes a counterflow circuit (not shown in the figure). The counterflow circuit substantially includes a liquid inlet control valve 365, a counterflow feeding control valve 367, a counterflow feeding pipe 360c, a counterflow discharging pipe 360d, and a counterflow discharging valve 369.

The counterflow circuit is used to clean the filtering device 360 to remove the vanadium pentoxide solid remaining in the filtering device 360, thereby extending the service life of the filtering device 360, and improving the utilization rate of the vanadium pentoxide solid.

In the electrolytic reduction system 300, generally, when the sulfuric acid solution containing pentavalent vanadium ions and a small amount of insoluble vanadium pentoxide solid is discharged from the liquid discharging port 313, the sulfuric acid solution is first introduced into the pipeline 313a, the counterflow feeding control valve 367 is closed and the liquid inlet control valve 365 is open, so the sulfuric acid solution may further flow through the filtering device 360 and flow out from the pipeline 360a to be pumped to the vanadium solution sub-tank 341 of the electrolytic tank 340.

When the filtering device 360 needs to be cleaned, the liquid inlet control valve 365 is closed, and the counterflow feeding control valve 367 is open, so that the sulfuric acid liquid discharged from the liquid discharging port 313 may flow into the counterflow feeding pipe 360c, and flow into the filtering device 360 from the filtrate outlet 363 of the filtering device 360 in a counterflow manner to remove the vanadium pentoxide solid remaining on a filtering unit (for example, a filtering plate). Then, the counterflow discharging valve 369 is open, so that the removed vanadium pentoxide solid and sulfuric acid liquid may flow back into the pipeline 315b via the counterflow discharging pipe 360d, and the utilization rate of the vanadium pentoxide solid may be improved. Through the design of the internal flow passage of the filtering device 360, or the addition of a valve at the inlet end (that is, the position where the filtering device 360 is connected) of the pipeline 360a, the sulfuric acid liquid flowing back into the filtering device 360 cannot flow out of the pipeline 360a, so as to avoid decrease in the effect of removing the vanadium pentoxide solid.

When the filtering device 360 needs to be cleaned, the valve 365 is closed, and the valve 367 is open, so that the sulfuric acid liquid discharged from the liquid discharging port 313 may flow into the pipeline 360c, and flow into the filtering device 360 from the filtrate outlet 363 of the filtering device 360 in a counterflow manner to remove the vanadium pentoxide solid remaining on a filtering unit (for example, a filtering plate). Then, the valve 369 is open, so that the removed vanadium pentoxide solid and sulfuric acid liquid may flow back into the pipeline 315b via the pipeline 360d, and the utilization rate of the vanadium pentoxide solid may be improved. Through the design of the internal flow passage of the filtering device 360, or the addition of a valve at the inlet end (that is, the position where the filtering device 360 is connected) of the pipeline 360a, the sulfuric acid liquid flowing back into the filtering device 360 cannot flow out of the pipeline 360a, so as to avoid decrease in the effect of removing the vanadium pentoxide solid.

In some embodiments, the sulfuric acid solution (that is, the sulfuric acid liquid in which the removed vanadium pentoxide solid is dissolved) flowing out of the liquid inlet 361 of the filtering device 360 may also be introduced to an additional storage tank or a mixing tank for mixing the sulfuric acid liquid and the vanadium pentoxide solid.

Figure 4:
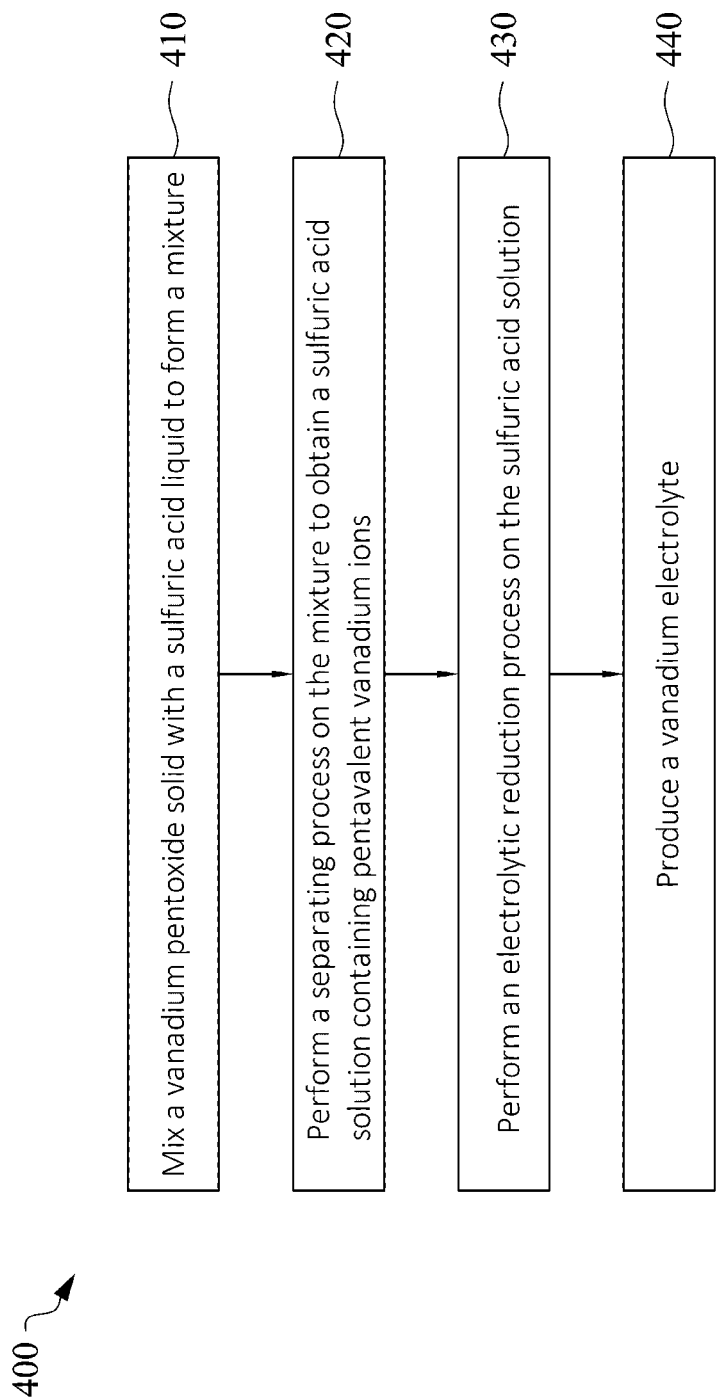
FIG. 4 is a schematic flow chart of a method for producing a vanadium electrolyte according to some embodiments of the present invention.

Please refer to FIG. 1 and FIG. 4 at the same time. FIG. 4 is a schematic flow chart of a method for producing a vanadium electrolyte according to some embodiments of the present invention. In the method 400, the sulfuric acid liquid stored in the sulfuric acid tank 120 and the vanadium pentoxide solid in the storage tank 130 are mixed first to form a mixture, as shown in step 410. Due to the poor dissolution properties of the vanadium pentoxide solid, only part of the vanadium pentoxide solid may be dissolved in the sulfuric acid liquid. In other words, the mixture contains insoluble vanadium pentoxide solid and a sulfuric acid solution, and the sulfuric acid solution contains pentavalent vanadium ions.

Then, as shown in step 420, the mixture is introduced into the separating device 110 through the feeding port 111 of the separating device 110 for being subjected to the separating process, thereby obtaining the separated vanadium pentoxide solid from the solid discharging port 115 of the separating device 110, and obtaining the separated sulfuric acid solution from the liquid discharging port 113. Then, the sulfuric acid solution may be pumped to the vanadium solution sub-tank 141 of the electrolytic tank 140 via the pipeline 113a, the pump 153 and the pipeline 113b, and further the electrolytic reduction process may be performed to reduce the pentavalent vanadium ions in the sulfuric acid solution to tetravalent vanadium ions and trivalent vanadium ions, and produce the vanadium electrolyte of the present invention, as shown in step 430 and step 440.

In the electrolytic process, vanadium ions are electrolytically reduced from pentavalent ions (VO2+) to tetravalent ions (VO2+), trivalent ions (V3+), and divalent ions (V2+) in sequence. This is because the standard redox potentials from pentavalence to tetravalence, from tetravalence to trivalence, and from trivalence to divalence are 1.0 V, 0.34 V, and −0.26 V, respectively, as shown below.

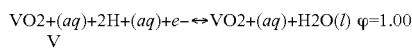

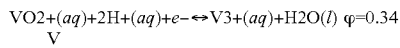

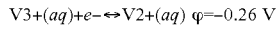

The electrolytic tank 140 includes a vanadium solution sub-tank 141 and a sulfuric acid sub-tank 143 separated by a separating membrane 140a. It may be understood that the type of the separating membrane 140a is not particularly limited, but the separating membrane 140a may effectively block the passage of sulfuric acid molecules and vanadium ions (that is, pentavalent vanadium ions and reduced tetravalent vanadium ions and trivalent vanadium ions) in the sulfuric acid solution in the vanadium solution sub-tank 141.

When step 430 is performed, when the pentavalent vanadium ions are reduced to the tetravalent vanadium ions and the trivalent vanadium ions, the sulfuric acid solution containing the tetravalent vanadium ions and the trivalent vanadium ions may flow into the storage tank 145 via the pipeline 141a and be used in a vanadium battery.

Figure 5:
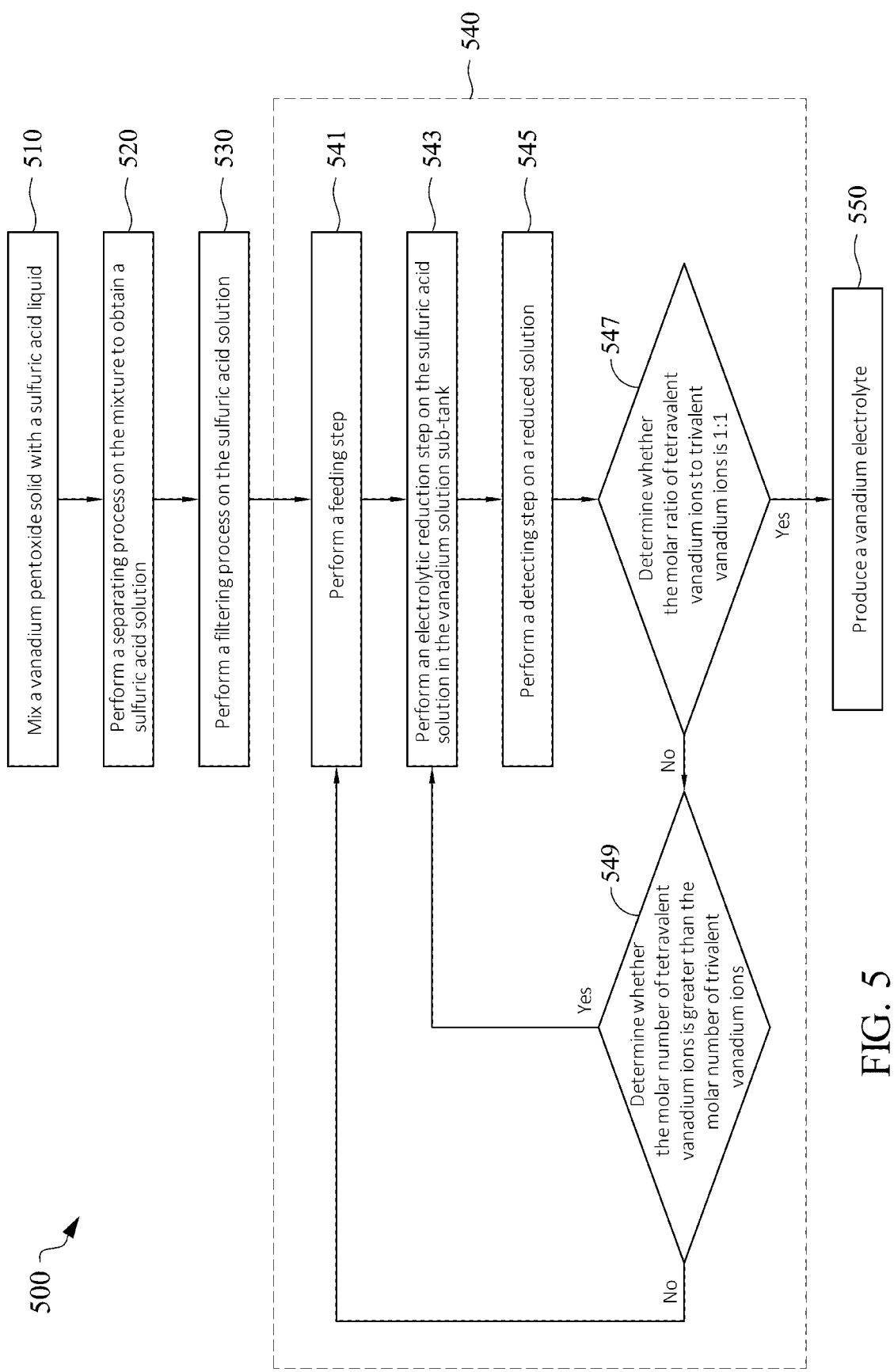
FIG. 5 is a schematic flow chart of a method for producing a vanadium electrolyte according to some embodiments of the present invention.

Please refer to FIG. 2 and FIG. 5 at the same time. FIG. 5 is a schematic flow chart of a method for producing a vanadium electrolyte according to some embodiments of the present invention. The process of the method 500 is substantially the electrolyte as that of the method 400. The difference between the two methods is that after the separating process (that is, step 520), the obtained sulfuric acid solution may be subjected to a filtering process (as shown in step 530), and the electrolytic reduction process 540 of the method 500 includes a plurality of operation steps and determination steps, and the steps are described in detail below.

When the filtering process is performed, the sulfuric acid solution obtained from the liquid discharging port 213 is introduced into the filtering device 260 via the pipeline 213a to further filter out fine insoluble vanadium pentoxide solids in the sulfuric acid solution, thereby improving the efficiency of the subsequent electrolytic reduction process and increasing the utilization rate of vanadium pentoxide. Similarly, via the pipeline 260a, the pump 253 and the pipeline 260b, the sulfuric acid solution filtered by the filtering device 260 may be pumped to the vanadium solution sub-tank 241 for being subjected to the subsequent electrolytic reduction process 540.

When the electrolytic reduction process 540 is performed, the feeding step 541 is performed first, so that the sulfuric acid solution may be pumped into the vanadium solution sub-tank 241 via the pipeline 260b, and the sulfuric acid liquid may be introduced into the sulfuric acid sub-tank 243 via a circulating pipeline. The circulating pipeline includes a pipeline 243a, a pump 255 and a pipeline 243b. In some embodiments, the circulating pipeline may include an additional sulfuric acid liquid storage tank to maintain the concentration of the sulfuric acid liquid in the sulfuric acid sub-tank 243 by circulation.

Then, electrodes of the electrolytic tank 240 are immersed in the sulfuric acid solution in the vanadium solution sub-tank 241 and the sulfuric acid liquid in the sulfuric acid sub-tank 243, respectively, and direct current is applied to perform the electrolysis step, thereby reducing the pentavalent vanadium ions in the sulfuric acid solution in the vanadium liquid sub-tank 241 to obtain tetravalent vanadium ions and trivalent vanadium ions, as shown in step 543. During electrolysis, the valence of vanadium ions gradually changes from pentavalent vanadium ions to tetravalent and trivalent vanadium ions. If the electrolysis continues, the molar ratio of the tetravalent vanadium ions to the trivalent vanadium ions gradually changes from 1:0 to 0:1, and even divalent vanadium ions are produced.

When the pentavalent vanadium ions in the sulfuric acid solution are reduced to tetravalent vanadium ions and trivalent vanadium ions, to determine whether the composition desired to be controlled (the ideal composition is tetravalent vanadium ion:trivalent vanadium ion=1:1) is reached in the electrolytic reduction step, the voltage detector 270 performs a detecting step on the electrolytically reduced sulfuric acid solution to determine whether the molar ratio of the tetravalent vanadium ions to the trivalent vanadium ions is 1:1, as shown in step 545 and step 547. If the molar ratio of the tetravalent vanadium ions to the trivalent vanadium ions in the sulfuric acid solution after the electrolytic reduction is (1+/−0.1):(1+/−0.1), the vanadium electrolyte of the present invention is produced, as shown in step 550. If the molar ratio of the tetravalent vanadium ions to the trivalent vanadium ions in the sulfuric acid solution after the electrolytic reduction is not (1+/−0.1):(1+/−0.1), whether the molar number of the tetravalent vanadium ions is greater than the molar number of the trivalent vanadium ions is further determined, as shown in step 549.

Since the standard redox potentials from pentavalence to tetravalence, from tetravalence to trivalence, and from trivalence to divalence are 1.0 V, 0.34 V, and −0.26 V, respectively, the determination may be performed by measuring the voltage of a measuring electrode to a reference electrode.

If the molar number of the tetravalent vanadium ions is greater than the molar number of the trivalent vanadium ions, the electrolytic reduction step is continued to be performed on the sulfuric acid solution in the vanadium solution sub-tank 241 to reduce part of the tetravalent vanadium ions to trivalent vanadium ions. On the contrary, if the molar number of the tetravalent vanadium ions is less than the molar number of the trivalent vanadium ions, the filtered sulfuric acid solution is introduced into the vanadium solution sub-tank 241 to electrolytically reduce the introduced pentavalent vanadium ions to tetravalent vanadium ions, so that the molar ratio of the tetravalent vanadium ions to the trivalent vanadium ions in the sulfuric acid solution in the vanadium solution sub-tank 241 meets 1:0 to 0:1.

In one embodiment, the electrolytic reduction system of the vanadium electrolyte and the method for producing the vanadium electrolyte of the present invention do not need to add chemical additives or other additives to increase the dissolution properties of the vanadium pentoxide solid, and pentavalent vanadium ions in the sulfuric acid solution may be reduced to tetravalent vanadium ions and trivalent vanadium ions by an electrolytic reduction process, thereby producing the vanadium electrolyte meeting the application requirements of vanadium batteries.

The following embodiments are used to illustrate the application of the present invention, but are not intended to limit the present invention. Anyone familiar with the art can make various variations and modifications without departing from the spirit and scope of the present invention.

Figure 6:
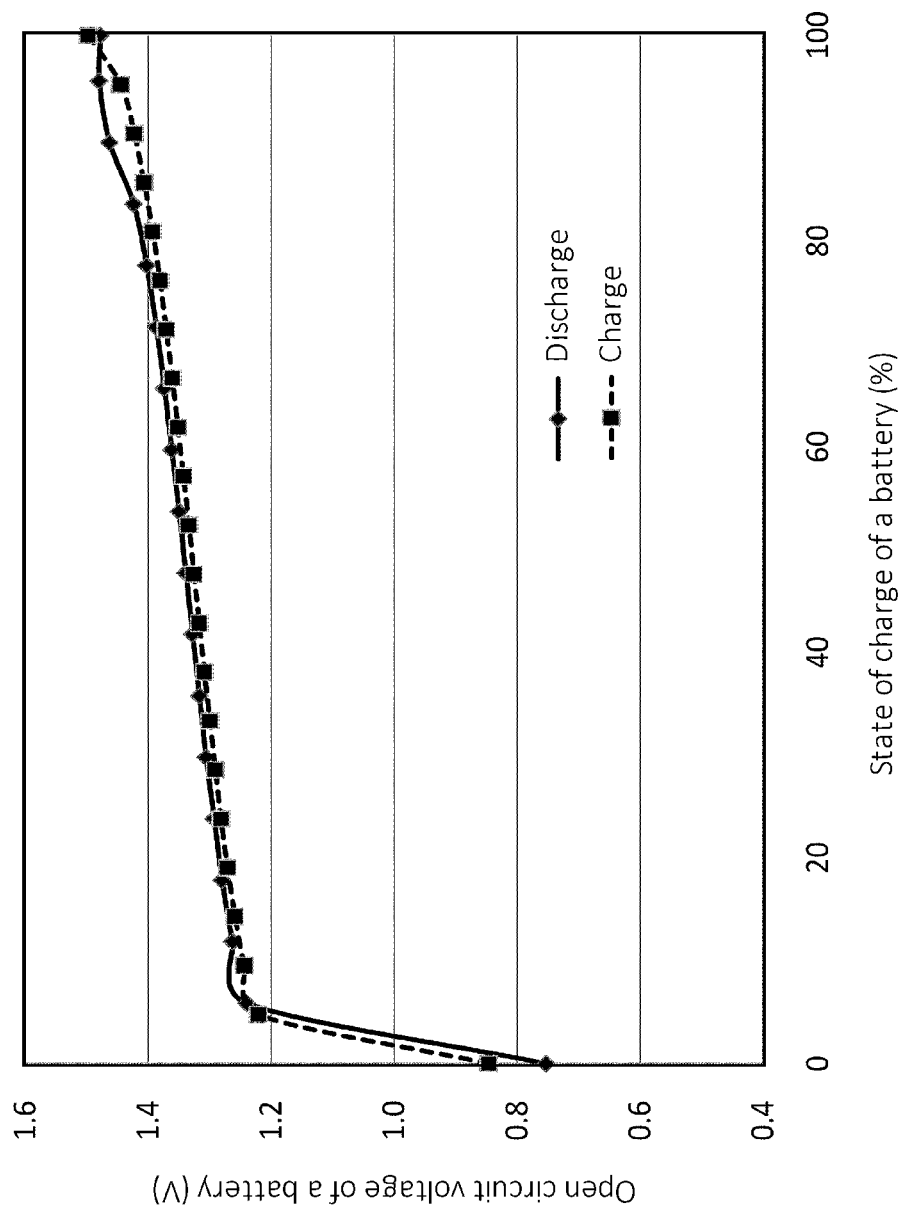
FIG. 6 shows the change in an open circuit voltage of a battery under different charging and discharging conditions

FIG. 6 shows the measured open circuit voltage (OCV) of an all-vanadium flow battery under different battery state of charge (SOC) levels. In the process of charge and discharge of batteries, the composition of an electrolyte gradually may change with the charge and discharge time. The measured open circuit voltage of the battery may also change. The principle may be expressed by the following equation.

$$E = (E_{0,+} - E_{0,-}) + \frac{RT}{nF}\ln\frac{[VO_2^+][H^+]^2[V^{2+}]}{[VO^{2+}][V^{3+}]}$$

In the above equation, $E_{0,+}$ and $E_{0,-}$ are the positive electrode potential and the negative electrode potential of a battery, respectively. In the process of charge and discharge of the battery, the components in the battery gradually change, and the components include pentavalent vanadium ions (VO2+), tetravalent vanadium ions (VO2+), trivalent vanadium ions (V3+), divalent vanadium ions (V2+), and hydrogen ions (H+).

According to the aforementioned description, the electrolytic reduction system of the vanadium electrolyte and the method for producing the electrolyte of the present invention can effectively separate the mixture containing a vanadium pentoxide solid and a sulfuric acid liquid by the separating device to obtain a sulfuric acid solution in which pentavalent vanadium ions are dissolved. Then, the sulfuric acid solution obtained by the separation is pumped to an electrolytic tank to be subjected to an electrolytic reduction process, thereby effectively reducing the pentavalent vanadium ions in the sulfuric acid solution to tetravalent vanadium ions and trivalent vanadium ions. When the molar numbers of the tetravalent vanadium ions and the trivalent vanadium ions are the same, the vanadium electrolyte is obtained.

In summary, the electrolytic reduction system of the vanadium electrolyte and the method for producing the electrolyte of the present invention do not require additional chemical additives and other additives to improve the dissolution properties of the vanadium pentoxide solid, so that impurities in the sulfuric acid solution are effectively reduced and a complicated purification step is not required, thereby improving the electrolytic efficiency of the electrolytic reduction process, and producing the vanadium electrolyte meeting the application requirements of vanadium batteries.

Although the present invention has been disclosed in the above embodiments, it is not intended to limit the present invention. Anyone of ordinary skill in the technical field to which the present invention belongs can make various variations and modifications without departing from the spirit and scope of the present invention. Therefore, the scope of protection of the present invention shall be subject to the scope of the attached claims.

What is claimed is:

1. An electrolytic reduction system of a vanadium electrolyte, comprising: a separating device, configured to separate a mixture consisting of a vanadium pentoxide solid and a sulfuric acid solution, thereby obtaining a vanadium solution from a liquid discharging port of the separating device and a vanadium solid from a solid discharging port of the separating device, the vanadium solution containing pentavalent vanadium ions; an electrolytic tank, comprising a separating membrane, the separating membrane separating the electrolytic tank into a vanadium solution sub-tank and a sulfuric acid sub-tank, the vanadium solution sub-tank connecting to the liquid discharging port to contain the vanadium solution, the electrolytic tank being configured to reduce the pentavalent vanadium ions in the vanadium solution to tetravalent vanadium ions and trivalent vanadium ions, and a molar ratio of the tetravalent vanadium ions to the trivalent vanadium ions being in a range of 1:0 to 0:1; and a filtering device, comprising a liquid inlet, a filtrate outlet, and a counterflow circuit, wherein the liquid inlet connecting to the liquid discharging port, the filtrate outlet connecting to the vanadium solution sub-tank, and a liquid inlet control valve being further arranged between the liquid inlet and the liquid discharging port; wherein the counterflow circuit comprising a counterflow feeding pipe and a counterflow discharging pipe, the counterflow feeding pipe connecting to the liquid discharging port of the separating device and the filtrate outlet, and the counterflow discharging pipe connecting to a feeding port of the separating device and the liquid inlet, a counterflow feeding control valve being further arranged between the liquid discharging port and the filtrate outlet, and a counterflow discharging control valve being further arranged between the feeding port and the liquid inlet; and the filtering device being configured to filter the vanadium solution, and the filtering device being configured to filter the vanadium solution wherein the liquid inlet control valve, the counterflow feeding control valve and the counterflow discharging control valve being configured to control the flow direction of vanadium solution flowing out from the liquid discharging port of the separating device; wherein the liquid inlet control valve is configured to be closed and the counterflow feeding control valve and the counterflow discharging control valve are configured to be opened to provide a counterflow to clean the filtering device through the counterflow circuit.

2. The electrolytic reduction system of a vanadium electrolyte according to claim 1, wherein the separating device is a cyclone separator.

3. The electrolytic reduction system of a vanadium electrolyte according to claim 1, wherein the vanadium solution sub-tank further comprises a voltage detector, and the voltage detector is configured to measure a voltage of the vanadium solution to detect the molar ratio of the tetravalent vanadium ions to the trivalent vanadium ions.

* * * * *